(12) United States Patent
Mannanayak et al.

(10) Patent No.: US 10,396,320 B2
(45) Date of Patent: *Aug. 27, 2019

(54) BATTERY RETENTION ASSEMBLY AND METHOD

(71) Applicant: Schlage Lock Company LLC, Carmel, IN (US)

(72) Inventors: Abdul Khadar Jailani Mannanayak, Bangalore (IN); James D. Ohl, Colorado Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,092

(22) Filed: Apr. 3, 2018

(65) Prior Publication Data
US 2019/0013499 A1  Jan. 10, 2019

Related U.S. Application Data

(63) Continuation of application No. 15/478,717, filed on Apr. 4, 2017, now Pat. No. 9,935,300, which is a continuation of application No. 14/286,801, filed on May 23, 2014, now Pat. No. 9,614,205.

(51) Int. Cl.
*H01M 2/10* (2006.01)

(52) U.S. Cl.
CPC ................. *H01M 2/1061* (2013.01)

(58) Field of Classification Search
CPC .................. H01M 2/1027; H01M 2/1061
See application file for complete search history.

(56) References Cited

U.S. PATENT DOCUMENTS

| | | |
|---|---|---|
| RE28,948 E | 8/1976 | Kaye |
| 3,990,919 A | 11/1976 | Krueger |
| 6,294,286 B1 | 9/2001 | Gosior et al. |
| 6,427,841 B2 | 8/2002 | Wani et al. |
| 8,273,471 B2 | 9/2012 | Hain et al. |
| 8,334,064 B2 | 12/2012 | Doyama |
| 8,378,629 B2 | 2/2013 | Larsen |
| 8,394,525 B2 | 3/2013 | Maguire et al. |
| 8,501,336 B2 | 8/2013 | Liu |
| 2012/0148877 A1 | 6/2012 | Kalman |

*Primary Examiner* — Brittany L Raymond
(74) *Attorney, Agent, or Firm* — Taft Stettinius & Hollister LLP (57) ABSTRACT

An illustrative battery retaining assembly comprises a retaining plate, and a casing including mounting devices. One of the mounting devices may include a hinge device, and another of the mounting devices may include a latch device. The retaining plate includes engagement portions engageable with the mounting devices, such that the retaining plate may be mounted to the casing. One of the engagement portions may include a channel engageable with the hinge device, and another of the engagement portions may include a catch engageable with the latch device. The mounting devices and engagement portions may be configured to enable the retaining plate to slide at an oblique angle with respect to the casing, to provide a variable separation distance between the casing and the retaining plate.

20 Claims, 7 Drawing Sheets

BATTERY RETENTION ASSEMBLY AND METHOD

CROSS-REFERENCE TO RELATED APPLICATIONS

The present application is a continuation of U.S. patent application Ser. No. 15/478,717 filed on Apr. 4, 2017 and issued as U.S. Pat. No. 9,935,300, which is a continuation of U.S. patent application Ser. No. 14/286,801 filed on May 23, 2014 and issued as U.S. Pat. No. 9,614,205, the contents of each application hereby incorporated by reference in their entirety.

FIELD OF THE INVENTION

The present invention relates generally to the field of battery retention mechanisms, and more particularly relates to devices and methods for selectively altering the space provided for the batteries and/or retention forces applied to the batteries.

BACKGROUND

It is known in the art to use various mechanisms to retain one or more batteries in a battery pack or a battery powered device. Certain conventional systems utilize fasteners such as bolts or screws to attach a plate or strap to a body in which the one or more batteries are to be retained. Use of such fasteners is time-consuming and requires tools that may or may not be readily available to a user. In some circumstances, batteries of different sizes may be available for use in a device. For example, there may be a tolerance for sizes of a particular type of battery, or batteries of various sizes may be used in a common battery pack or battery powered device. When larger batteries are used, in such conventional systems, the plate may become deformed when attached across the batteries; when the resulting deformation is significant, the plate may become warped. A warped plate may in turn fail to properly retain smaller batteries that are utilized subsequent to the use of larger batteries. This may lead to smaller batteries becoming dislodged, which may result in a power failure. Additionally, plates in which deformations have been created may fail structurally. For the foregoing reasons among others, such conventional systems fail to accommodate batteries of various sizes and tolerances.

Therefore, there exists a need for improved battery retention systems and methods that provide for retention of batteries of different sizes. Improved systems and methods may also provide for locking and release mechanisms and structures that do not require the use of drivers or other tools for operation. Such systems and methods may additionally provide for evenly distributed retention forces across batteries being retained in a battery pack or battery powered device.

SUMMARY

An illustrative battery retaining assembly comprises a retaining plate, and a casing including mounting devices. One of the mounting devices may include a hinge device, and another of the mounting devices may include a latch device. The retaining plate includes engagement portions configured to engage the mounting devices, such that the retaining plate may be mounted to the casing. One of the engagement portions may include a channel engageable with the hinge device, and another of the engagement portions may include a catch engageable with the latch device. The mounting devices and engagement portions may be configured to enable the retaining plate to slide at an oblique angle with respect to the casing, to provide a variable separation distance between the casing and the retaining plate. Further embodiments, forms, features, aspects, benefits, and advantages of the present application shall become apparent from the description and figures provided herewith.

DETAILED DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
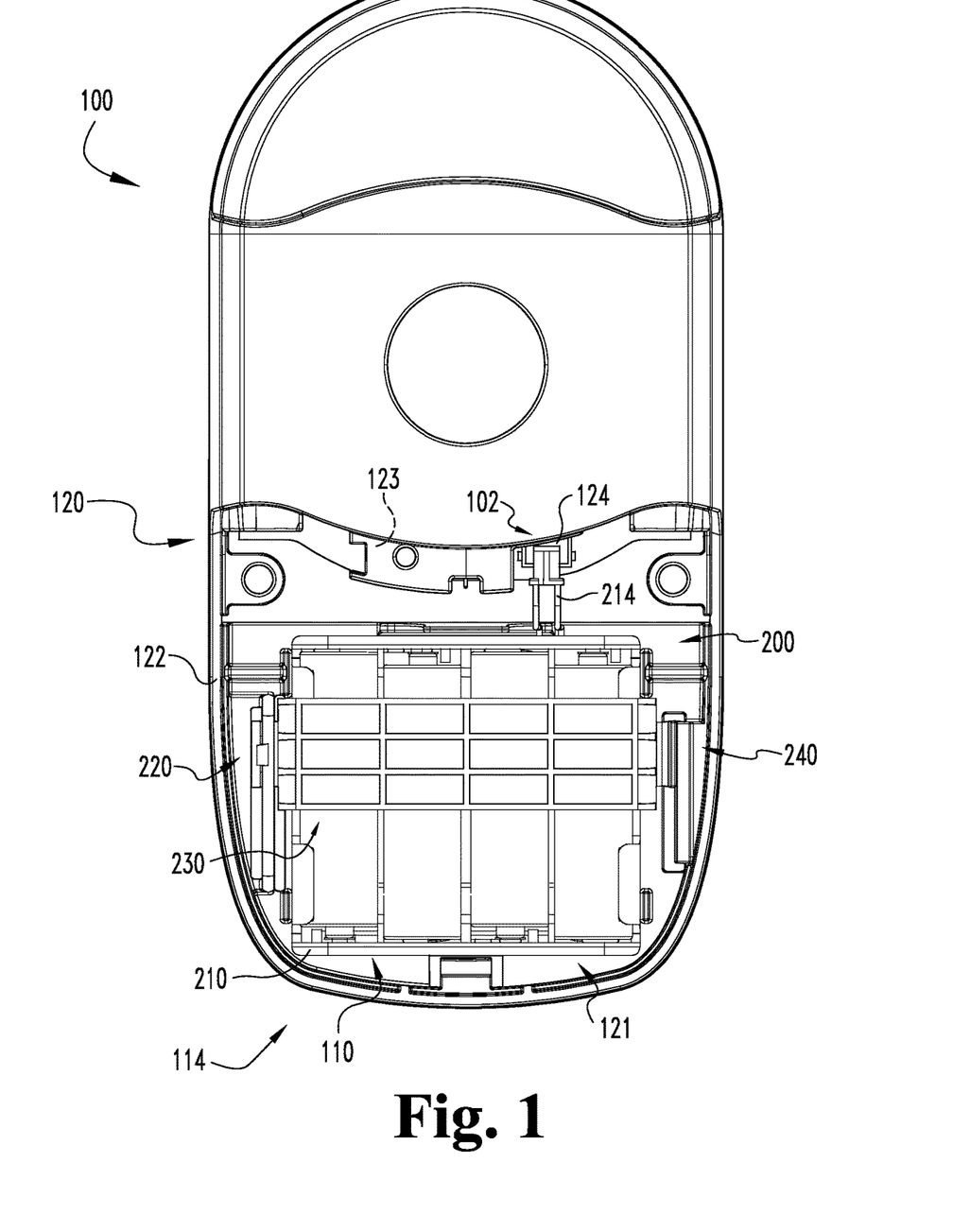
FIG. 1 is an elevational view of an electronic device including a battery retention system according to one form of the invention.
Figure 2:
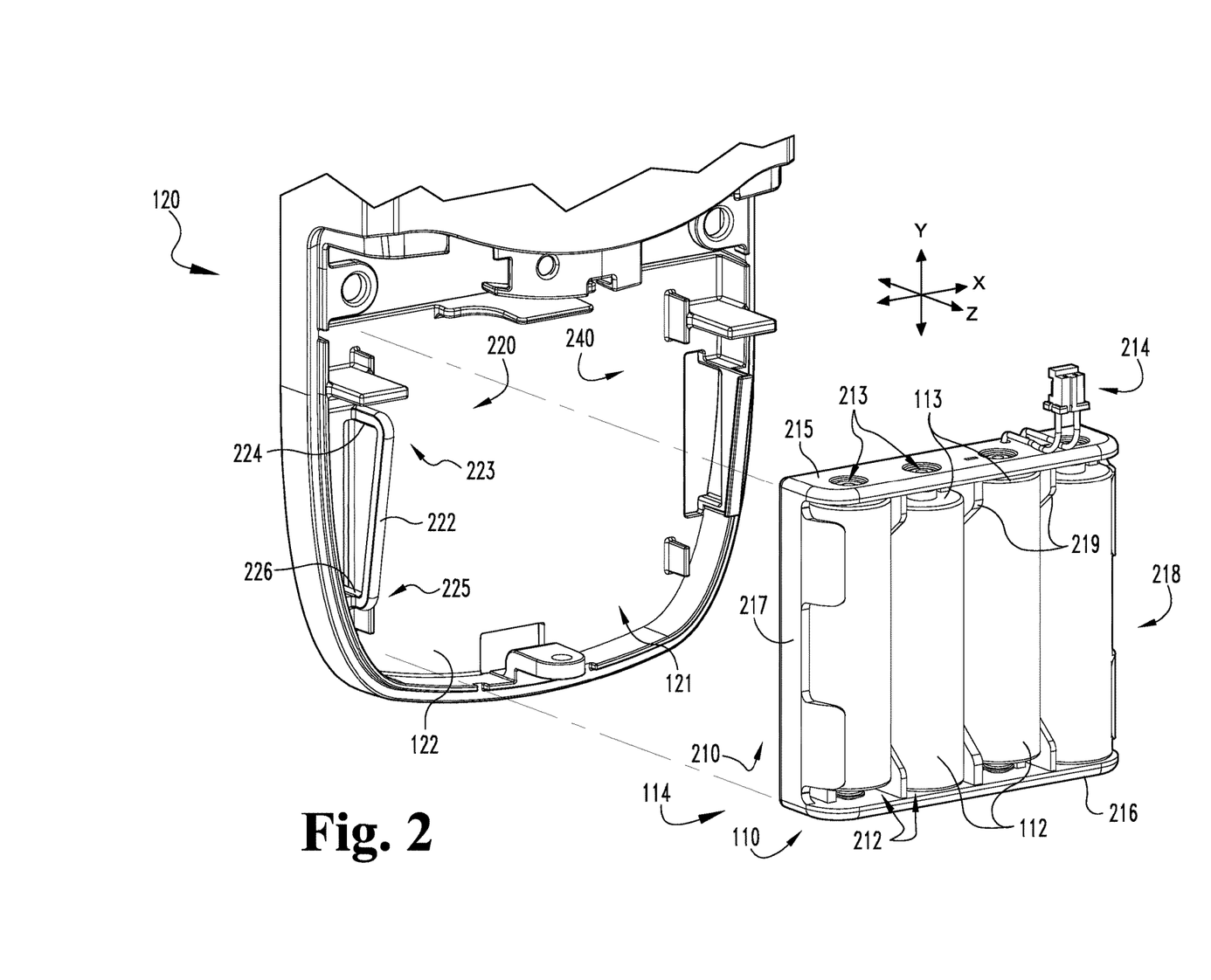
FIG. 2 is a perspective view of a portion of the battery retention system aligned for assembly with the device of FIG. 1.
Figure 3:
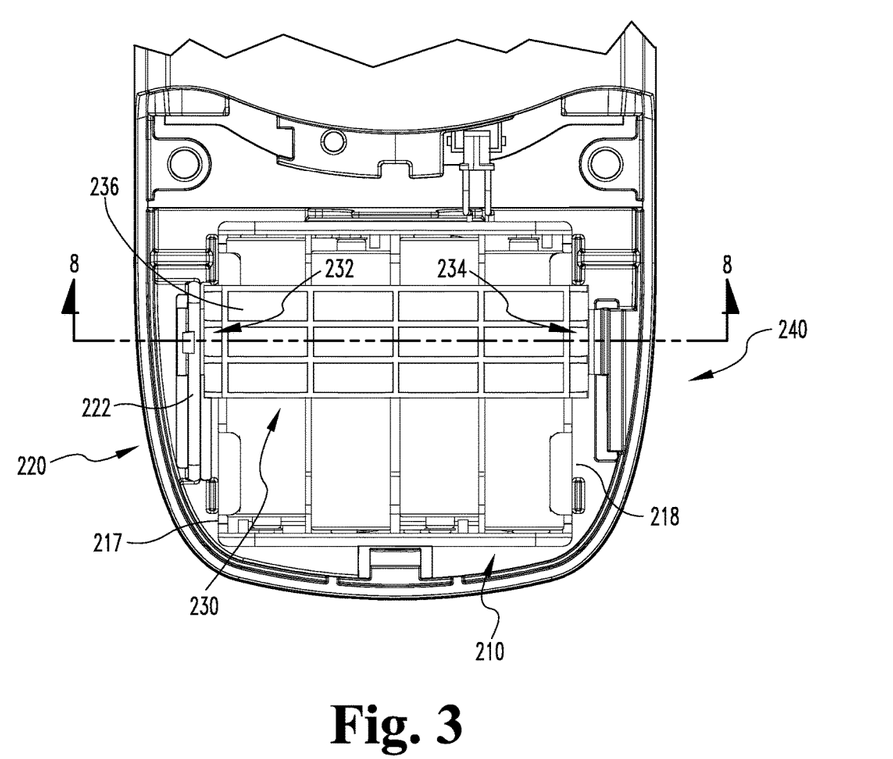
FIG. 3 is a front elevational view of a portion of the electronic device including the battery retention system.

With reference to FIGS. 1-3, an illustrative electronic device 100 includes a battery set 110, a casing 120, and an exemplary battery retention assembly 200 according to an embodiment of the invention. As best seen in FIG. 2, the device 100 comprises a plurality of mutually orthogonal axes, including a lateral axis X, a longitudinal axis Y, and a transverse axis Z. In the illustrated form, the lateral and transverse axes X, Z define a horizontal plane, and the longitudinal axis Y extends in a vertical direction. It is also contemplated that the device 100 may be oriented in another manner. For example, any two of the axes may define a horizontal plane, and the third axis may extend in a vertical direction, or the axes may be offset from the horizontal and vertical directions at an oblique angle.

The device 100 is a battery powered device configured to receive electrical power from the battery set 110, which is operable to provide electrical power to the device 100 or another battery-powered device. While the illustrated battery set 110 comprises a plurality of batteries 112, it is also contemplated that the battery set 110 may comprise a single battery 112. The casing 120 may include an opening 121 defined between a mounting plate 122 and a front plate 123, which may be releasably attached to the casing 120. As described in further detail below, certain features of the illustrated battery retention assembly 200 may be integrally formed with the casing 120, which comprises a portion of the device 100. It is also contemplated that the casing 120 may not necessarily be a portion of the electronic device 100, but may instead be a portion of the battery retention assembly 200. In such forms, the device 100 may be configured to be electrically coupled to a battery set retained by the battery retention assembly 200.

The casing 120 may also house various internal components (not illustrated) of the device 100, and may include a jack or socket 124 electrically coupled to at least some of the internal components. In the illustrated form, the electronic device 100 comprises a battery-powered electronic locking mechanism, and the casing 120 comprises an escutcheon. It is also contemplated that the new and inventive battery retention assembly 200 described hereinafter may be utilized in other forms of battery-powered devices, and that such other forms of the device 100 may not necessarily comprise a security or access control system.

The exemplary battery retention assembly 200 includes a housing 210 configured to receive the battery set 110, a hinge device 220 positioned on a first side of the housing 210, a retaining device 230 pivotally, slidingly, and releasably coupled to the hinge device 220, and a latch device 240 on a second side of the housing 210. The hinge device 220 and latch device 240 are mounting devices through which the retaining device 230 can be mounted to the casing 120. As described in further detail below, the retaining device 230 includes first and second coupling portions configured to engage the hinge device 220 and the latch device 240. When the assembly 200 is assembled, the housing 210 is retained in the casing 120 by the retaining device 230, which is releasably coupled with the latch device 240 such that the retaining device 230 is restrained from pivotal movement about the hinge device 220.

As best seen in FIG. 2, the exemplary housing 210 comprises a plurality of channels 212, each configured to receive one of the batteries 112. The housing 210 may further comprise leads 213 configured to engage battery terminals 113 when the batteries 112 are positioned in the channels 212, and a plug or connector 214 electrically coupled to the leads 213. The connector 214 is configured to engage the socket 124, such that an electrical connection 102 (FIG. 1) is formed between the battery set 110 and the electrical components of the device 100. In certain forms, the housing 210 may wholly or in part be integrally formed with the mounting plate 122. In other embodiments, the housing 210 and the battery set 110 may be considered as a battery assembly or battery pack 114. In the illustrated battery pack 114, the batteries 112 are removable from the housing 210; it is also contemplated that a battery pack or battery assembly may be formed as a unit including a battery set, and the unit may omit certain features of the housing 210. In the present disclosure, the battery set 110, the battery housing 210, or the battery set 110 and housing 210 collectively may be referred to as the battery pack 114, the battery assembly, or the one or more batteries to be retained by the battery retention assembly 200.

As best seen in FIG. 2, the illustrated housing 210 comprises a plurality of sections which collectively define the channels 212, including a top 215, a bottom 216, a first side 217, a second side 218, and a plurality of internal walls 219. In various embodiments, one or more of the sections 215-219 may be a separate component of the housing 210 or may be integrally formed as a portion of the housing 210.

Figure 4:
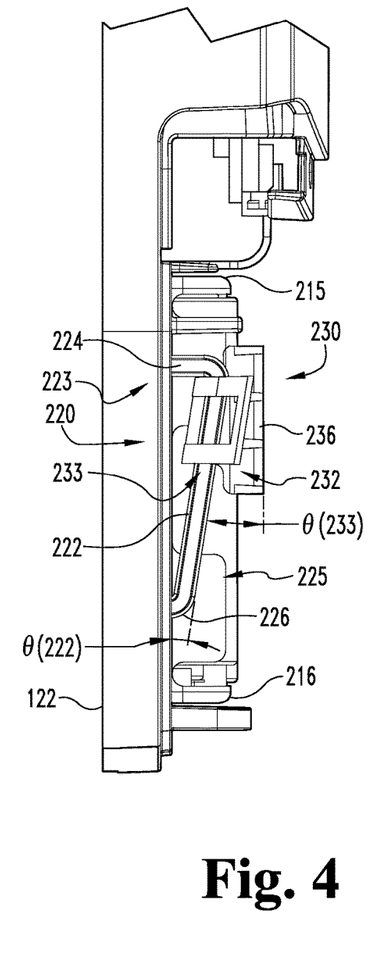
FIG. 4 is a left side elevational view of the portion depicted in FIG. 3.

As best seen in FIGS. 2 and 4, the hinge device 220 is coupled to the casing 120 near the housing first side 217, and comprises a hinge pin 222 including first and second end portions 223, 225, and first and second legs 224, 226 connecting the hinge pin 222 to the mounting plate 122. The first leg 224 extends transversely toward the mounting plate 122 from the first end portion 223, and is coupled to the mounting plate near the housing top section 215. The second leg 226 extends transversely toward the mounting plate 122 from the second end portion 225, and is coupled to the mounting plate 122 near the bottom section 216. In the illustrated embodiment, the top or first leg 224 comprises a greater length than the bottom or second leg 226, such that the first end portion 223 is offset from the mounting plate 122 by a first distance, and the second end portion 225 is offset from the mounting plate 122 by a second distance. As a result, there is a variable distance between the mounting plate 122 and the hinge pin 222; the variable distance generally decreases when traveling along the hinge pin 222 from the first leg 224 toward the second leg 226 in the longitudinal (e.g. downward) direction.

In the illustrated form, the hinge pin 222 is substantially straight, and forms an oblique angle $\theta 222$ (FIG. 4) with respect to the mounting plate 122. That is to say, the transverse distance between a section of the hinge pin 222 and the mounting plate 122 varies linearly with the longitudinal position of the section. In other embodiments, the variable distance between the mounting plate 122 and the hinge pin 222 may not necessarily be linear and may not necessarily be continuous from one leg to the other. For example, the hinge pin 222 may include curved portions, portions with discrete steps, linear portions, and any combination of portions of these shapes or other shapes. Additionally, in certain forms, the hinge device 220 may not necessarily include the second leg 226, and the second end portion 225 may be directly coupled to the mounting plate 122.

With specific reference to FIGS. 3-8, the retaining device 230 includes a hinge coupling portion 232 configured to engage the hinge device 220, a latch coupling portion 234 configured to engage the latch device 240, and a plate portion 236 connecting the hinge coupling portion 232 and the latch coupling portion 234. In the illustrated form, the retaining device 230 is formed of a flexible, resilient material, such that each portion 232, 234, 236 thereof is capable of elastic deformation. It is also contemplated that the retaining device 230 may be formed of a plurality of materials, one or more of which may be rigid or substantially rigid.

Figure 8:
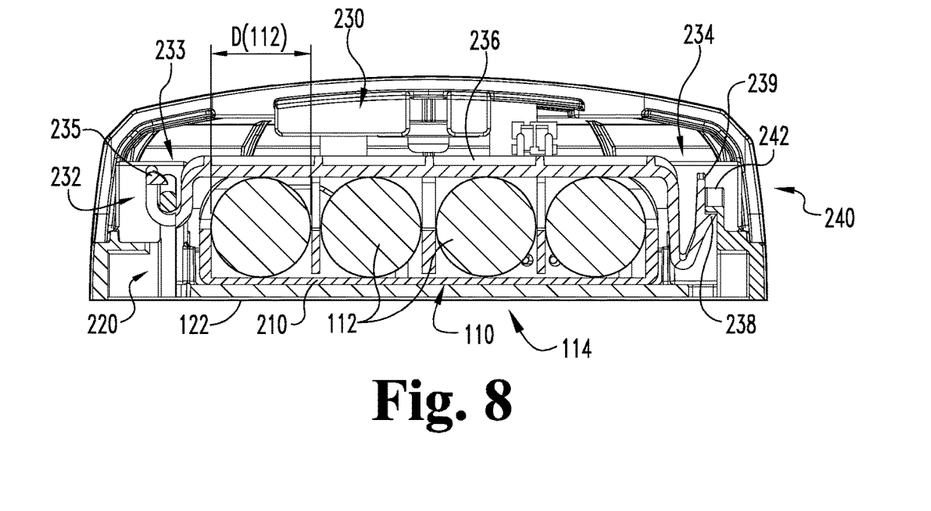
FIG. 8 is a cross-sectional view of the battery retention system with a first set of batteries.

As best seen in FIG. 8, the hinge coupling portion 232 includes a channel 233 configured to slidingly receive the hinge pin 222; the channel 233 may, for example, comprise a substantially U-shaped cross-section. In the illustrated form, the hinge coupling portion 232 comprises a protrusion 235 extending into the channel 233, such that the hinge coupling portion 232 may be snap fit to the hinge pin 222, and the protrusion 235 may retain the hinge pin 222 within the channel 233. When the hinge pin 222 is received in the channel 233, the retaining device 230 is pivotally, slidingly, and releasably coupled with the hinge device 230. That is to say, the retaining device is operable to pivot about the hinge pin 222, slide along the hinge pin 222, and may be released from the hinge pin 222 by decoupling the snap fit connection. It is also contemplated that the retaining device 230 may be slidingly, pivotally, and/or releasably coupled to the hinge device 220 in another manner. Furthermore, in certain embodiments, the coupling may not necessarily be releasable, and the retaining device 230 may remain coupled to the hinge device 220.

As best seen in FIGS. 5-8, the latching mechanism 240 is coupled to the casing 120 near the housing second side 218, and comprises a latching lip 242 including first and second end portions 243, 245, and first and second ends 244, 246 connecting the lip 242 to the mounting plate 122. The first end 244 extends transversely toward the mounting plate 122 from the first end portion 243, and is coupled to the mounting plate 122 near the housing top section 215. The second end 246 extends transversely toward the mounting plate 122 from the second end portion 245, and is coupled to the mounting plate 122 near the bottom section 216. In the illustrated embodiment, the top or first end 244 comprises a greater length than the bottom or second end 246, such that the first end portion 243 is offset from the mounting plate 122 by a first distance, and the second end portion 245 is offset from the mounting plate 122 by a second lesser distance. As such, there is a variable distance between the mounting plate 122 and the lip 242; the variable distance generally decreases when traveling along the lip 242 from the first end 244 toward the second end 246 (e.g. in the downward direction).

In the illustrated form, the lip 242 is substantially straight, and forms an oblique angle θ242 (FIG. 5) with respect to the mounting plate 122; the lip angle θ242 may correspond to the hinge pin angle θ222. That is to say, the horizontal distance between a section of the lip 242 and the mounting plate 122 varies linearly with the vertical position of the section. In other embodiments, the variable distance between the mounting plate 122 and the lip 242 may not necessarily be linear and may not necessarily be continuous from one leg to the other. For example, the lip may include curved portions, portions with discrete steps, linear portions, and any combination of portions of these shapes or other shapes. Additionally, in certain forms, the second end portion 245 may be directly coupled to the mounting plate 122.

Figure 5:
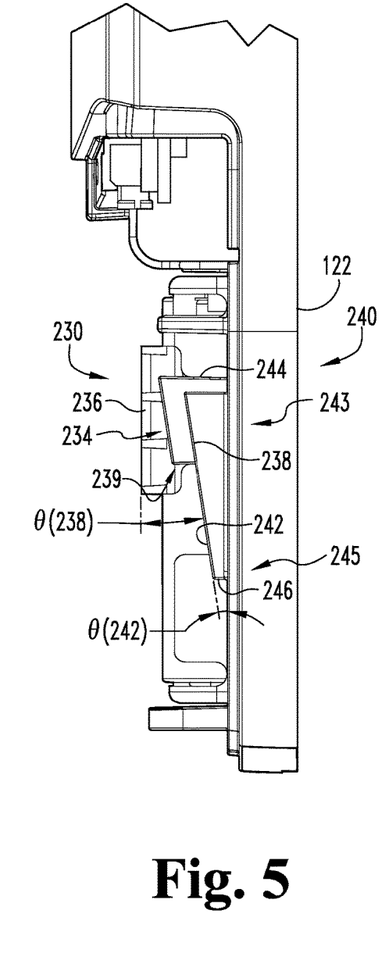
FIG. 5 is a right side elevational view of the portion depicted in FIG. 3.
Figure 6:
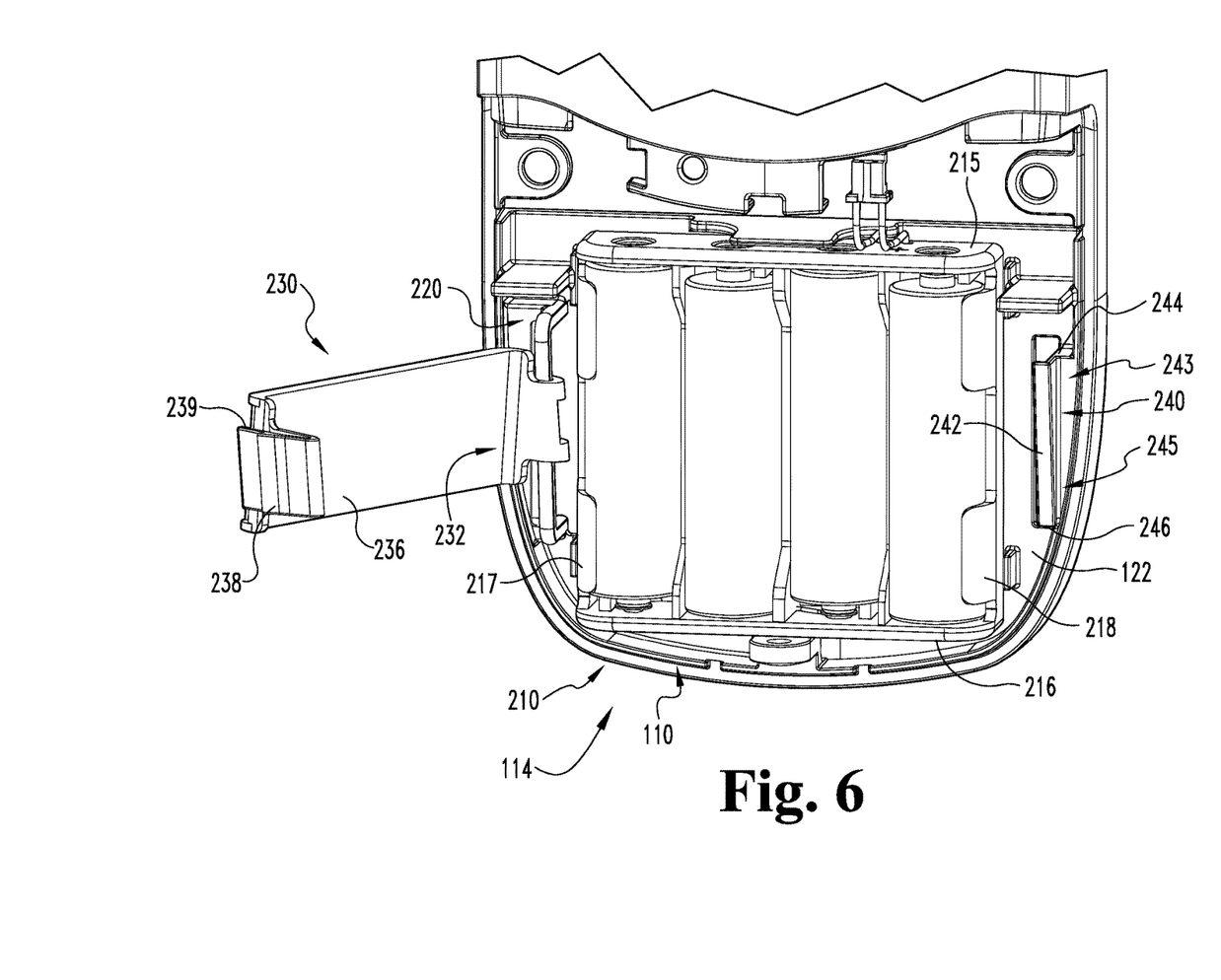
FIG. 6 is a perspective view of the of the portion depicted in FIG. 3 with the battery retention system in an open position.
Figure 7:
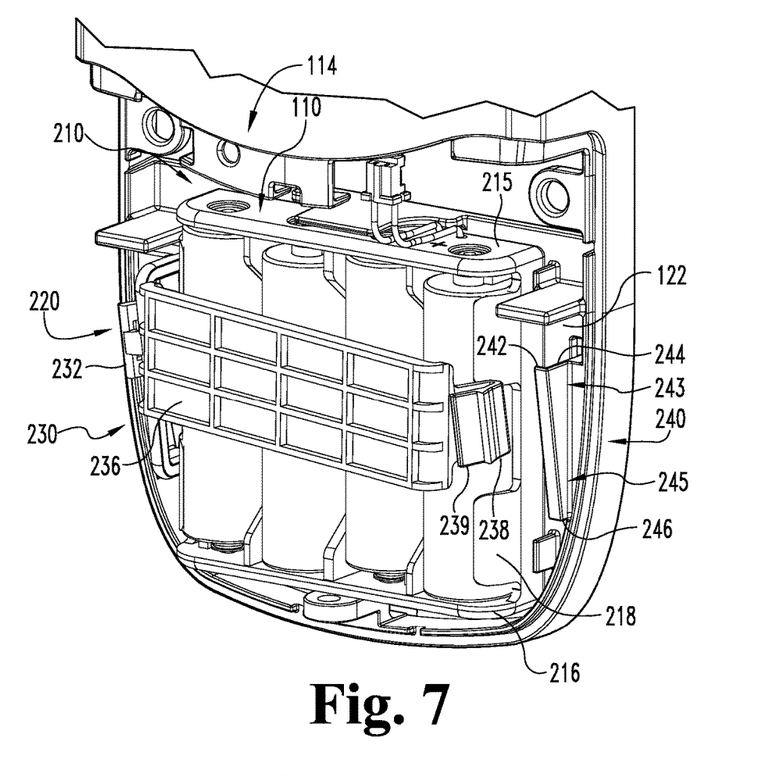
FIG. 7 is a perspective view of the portion, with the battery retention system being moved toward a closed position.

With continued reference to FIGS. 5-8, the latch engaging portion 234 is configured to releasably couple the retaining device 230 to the latch device 240. In the illustrated form, the latch engaging portion 234 includes a catch 238 and a release 239. When the retaining device 230 is coupled to the hinge device 220 as described above, the retaining device 230 is pivotable from an open position (FIG. 6) to a position where the latch engaging portion 234 is adjacent to the latch device 240 (FIG. 7). In this position, urging the plate portion 236 toward the mounting plate 122 causes the latch engaging portion 234 and the latch device 240 to elastically deform in opposite directions.

Once the catch 238 passes the lip 242, the latch engaging portion 234 and the latch device 240 snap into engagement with one another, and the retaining device 230 is in a closed position (FIG. 8). In the closed position, the battery pack 114 is retained between the mounting plate 122 and the plate portion 236. The opening 121 may then be enclosed, for example by attaching the casing front plate 123, such that the battery set 110 is retained by the battery retaining assembly 200, which is enclosed in the casing 120.

The retaining device 230 may be decoupled from the latch device 240 by urging the release 239 toward the hinge device 220. This causes the latch engaging portion 234 to flex such that the catch 238 disengages from the lip 242. Once the catch 238 is disengaged from the lip 242, the retaining device 230 may be pivoted away from the mounting plate 122 about the hinge device 220, and the battery pack 114 may be removed.

While the illustrated retaining device 230 is pivotally and slidingly coupled to the hinge device 220 and slidingly coupled to the latch device 240, it is also contemplated that the assembly 200 may comprise another combination of mounting devices through which the retaining device 230 may be coupled to the mounting plate 122. For example, in certain forms, the hinge device 220 may be omitted, and the assembly 200 may instead include two latch devices 240 on opposite sides of the housing 210. In such a case, the retaining device 230 may include two of the latch engaging portions 234.

Figure 9:
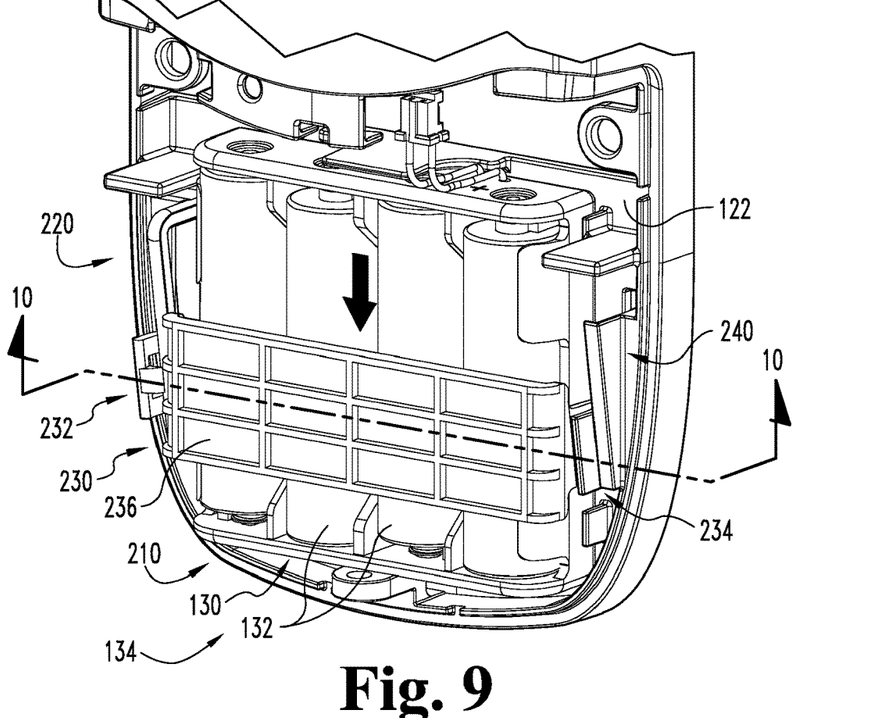
FIG. 9 is a perspective view of the electronic device and battery retention system with a second set of batteries.
Figure 10:
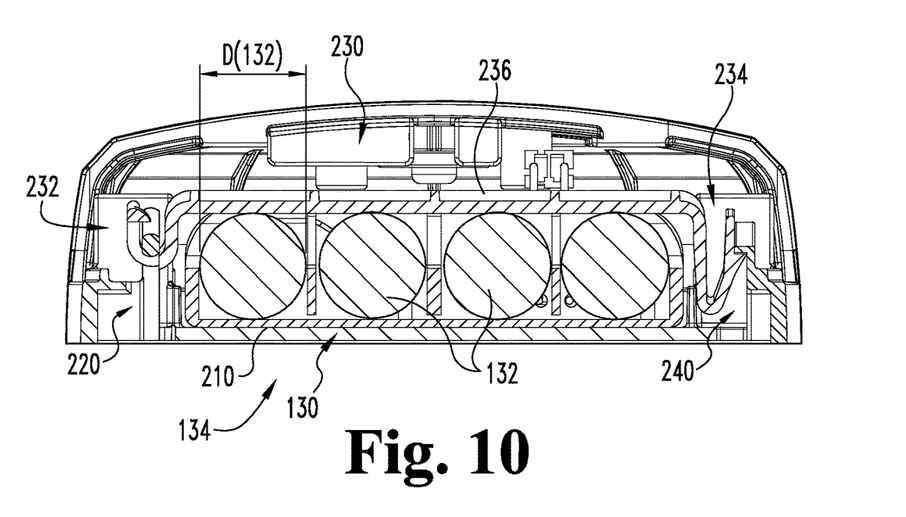
FIG. 10 is a cross-sectional view of the battery retention system with the second set of batteries.

Certain forms of electronic devices such as the device 100 may be operable by a number of different battery sets and/or battery packs of varying transverse widths. FIGS. 1-8 depict the device 100 with a first battery set 110 including a first plurality of batteries 112, while FIGS. 9 and 10 depict the device 100 with a second battery set 130 including a second plurality of batteries 132. The first batteries 112 comprise a first diameter $D_{112}$ such as about 0.57 inches, whereas the second batteries comprise a second, lesser diameter $D_{132}$, such as about 0.52 inches. Thus, the transverse width of the first battery pack 114 is greater than the transverse width of the second battery pack 134, for example by about 0.05 inches. Accordingly, the inventive battery retaining assembly 200 includes a variety of features which enable the assembly 200 to retain battery sets or battery packs of varying widths within the casing 120. For example, the channels 212 may comprise an inner width or diameter corresponding to the diameter of the largest batteries 132 which can be used with the device 100.

Additionally or in the alternative, the retaining device 230 may be operable in a plurality of positions, wherein a separation distance between the mounting plate 122 and the plate portion 236 is different in each of the positions. For example, the retaining device 230 may be operable in a first position (FIG. 3) wherein the separation distance corresponds the greatest width of battery pack 114 usable with the device 100, and a second position (FIG. 9) wherein the separation distance corresponds to the smallest width of battery pack 134 usable with the device 100. The retaining device 230 may further be operable in a plurality of intermediate positions (not illustrated) wherein the separation distances correspond to widths of batteries or battery packs having widths between the greatest width and the smallest width. Due at least in part to the above-described features of the hinge device 220 and the latch device 240, the illustrated retaining device 230 is operable in such a plurality of positions. The retaining device 230 may further comprise features which enable the assembly 200 to retain the battery packs 114, 134 within the casing 120 while substantially preventing pivoting and/or transverse motion of the battery packs 114, 134.

As best seen in FIGS. 4 and 5, in the illustrated form, the hinge pin 222 and the lip 242 are offset at oblique angles θ222, θ242 with respect to the mounting plate 122. The channel 233 and the catch 238 may likewise be offset at oblique angles θ233, θ238 with respect to the plate portion 236. In the illustrated embodiment, each of the angles θ222, θ233, θ238, θ242 is substantially equal, such that the plate portion 236 is substantially parallel to the mounting plate 122 in each of the plurality of positions of the retaining device 230. The retaining device 230 is operable between the plurality of positions by moving transversely at an oblique angle with respect to the mounting plate 122, such that the separation distance between the retaining device 230 and the mounting plate 122 is altered as the longitudinal position of the retaining device 230 changes. As used herein, the term "transversely at an oblique angle with respect to the mounting plate 122" includes movement along the inclines of the hinge device 220 and the latch device 240 and other similar slight deviations from precisely parallel. Movement that is oblique to the plane of the mounting plate 122 could include longitudinal and transverse movement as the retaining device 230 travels along the hinge pin 222 in an open position (FIG. 6) or a partially closed position (FIG. 7). The retaining device 230 may then be rotated about the hinge pin 222 to a closed position (FIG. 8), to retain the battery pack 114 within the casing 120.

The parallel surfaces of the mounting plate 122 and the plate portion 236 may retain battery packs of any appropriate size therebetween, while substantially preventing pivoting and/or transverse motion of the battery pack. In the first position of the retaining device 230 (FIG. 3), the plate portion 236 is substantially parallel to the mounting plate 122, such that substantially the entire plate portion 236 is separated from the mounting plate 122 by a first separation distance corresponding to the transverse width of the battery pack 114. The inner surface of the plate portion 236 thus may be substantially flush with an outer surface of the battery pack 114.

When the smaller battery pack 134 is utilized and the retaining device 230 is closed, the retaining device 230 may initially be placed in the first position, and subsequently urged toward the second position. The plate portion 236 remains substantially parallel to the mounting plate 122 as the retaining device 230 moves transversely at an oblique angle with respect to the mounting plate 122 to the second position. That is to say, as the retaining device moves from the first position to the second position, it follows a line which extends at an oblique angle with respect to the mounting plate 122. In the second position (FIGS. 9, 10), the plate portion 236 is also substantially parallel to the mounting plate 122, such that substantially the entire plate portion 236 is separated from the mounting plate 122 by a second separation distance corresponding to the transverse width of the battery pack 134. The inner surface of the plate portion 236 thus may be substantially flush with an outer surface of the battery pack 134.

In the illustrated form, the longitudinal direction is a vertical direction, and the upper portions of the hinge pin 222 and lip 242 are further away from the mounting plate 122 than the lower portions thereof. As such, downward motion of the retaining device 230 causes the plate portion 236 to approach the mounting plate 122. Thus, gravitational forces may urge the retaining device 230 downward, resulting in the plate portion 236 being urged transversely toward the mounting plate 122, such that the plate portion 236 is urged into contact with battery packs of any appropriate size.

In additional embodiments of the battery retaining assembly 200, the hinge device 220, retaining device 230, and latch device 240 or similar components may include ratchets, indexing indentations, protrusions, teeth, or other materials or structures that increase friction between the retaining device 230 and the hinge device 220 or latch device 230 in order to control sliding among the components. For example and without limitation, increased resistance may be desirable to prevent the retaining device 230 from slipping relative to the casing 120 once it has been adjusted to a satisfactory position.

Method embodiments of the invention may include methods of retaining one or more batteries. Such methods may include positioning one or more batteries in a housing of a battery retention system. For example, FIG. 2 illustrates a battery pack 114 including a battery set 110 positioned in a housing 210. In other embodiments, a battery pack or battery set may be positioned directly the battery retention assembly 200 without the use of the housing 210.

Method embodiments may also include coupling a retaining device 230 to the casing 120 to secure the battery pack 114 within the casing 120. The act of coupling the retaining device 230 to the casing 120 may include making a coupling between inclined components of one or both of the casing 120 and the retaining device 230. In the illustrated embodiment, inclined components in the form of the hinge device 220 and the latch device 240 are coupled to or integrally formed with the mounting plate 122. The retaining device 230 includes angled interfaces 232, 234 that enable the retaining device 230 to be moved transversely at an oblique angle with respect to the mounting plate 122 along the hinge device 220 and the latch device 240. When in the closed position (FIGS. 3-5, 8-10), the transverse, oblique motion of the retaining device 230 may be such that the plate portion 236 remains substantially parallel with the mounting plate 122, to provide even retention forces across the battery pack 114, 134 regardless of the transverse width of the battery pack 114, 134.

As illustrated with particularity in FIGS. 6 and 7 and described further herein, the act of coupling the retaining device 230 to the casing 120 may include pivotally and slidingly coupling the hinge engaging portion 232 to the hinge device 220, and releasably and slidingly coupling the latch engaging portion 234 to the latch device 240. Other embodiments may include pivotally and slidingly coupling one end of a retaining device to a casing and releasably and slidingly coupling a second end of the retaining device to the casing.

Method embodiments may also include moving the retaining device transversely at an oblique angle with respect to the mounting plate 122 to selectively alter a separation distance between the retaining device 230 and the mounting plate 122. For example, as illustrated in FIG. 9, the retaining device 230 is moved transversely at an oblique angle with respect to the mounting plate 122 to alter the separation distance between the retaining device 230 and the mounting plate 122 to the transverse width of the battery pack 134.

As applied particularly to the illustrated embodiment, the act of moving the retaining device 230 transversely at an oblique angle may occur after the act of coupling the hinge engaging portion 232 to the hinge device 220, but before the act of coupling the latch engaging portion 234 to the latch device 240. In such forms, the method may include attaching the retaining device 230 to the hinge device 220 as shown in FIG. 6, urging the retaining device 230 in the longitudinal direction such that the retaining device 230 moves transversely and obliquely to the desired final position, rotating the retaining device 230 about the hinge device 220, and subsequently urging the latch engaging portion 234 into engagement with the latch device 240.

Alternatively, the act of moving the retaining device 230 transversely at an oblique angle may occur after the act of coupling the hinge engaging portion 232 to the hinge device 220, and also after the act of coupling the latch engaging portion 234 to the latch device 240. In such forms, the method may include attaching the retaining device 230 to the hinge device 220 as shown in FIG. 6, rotating the retaining device 230 about the hinge device 220 to a partially closed position (FIG. 7), urging the latch engaging portion 234 into engagement with the latch device 240 to close the assembly 200 (FIG. 8), and subsequently urging the retaining device 230 in the longitudinal direction such that the retaining device 230 moves transversely and obliquely to the desired final position (FIG. 9). In other embodiments, the act of moving a retaining device obliquely toward the mounting plate 122 may include moving the retaining device 230 along an arc, about a pivot point, or more specifically about a pivot point near the center of a substantially circular device.

One aspect of the present application may include a battery retention system for providing battery power to a battery powered device includes a body configured to receive one or more batteries comprising: a back against which one or more batteries may be retained, a top adjacent to the back, a bottom adjacent to the back and opposite from the top, a first side adjacent to the back and adjacent to the top and bottom, and a second side adjacent to the back and opposite from the first side; a hinge pin coupled to the body near the first side, wherein the hinge pin is configured to be coupled at a variable distance away from the back from the top to the bottom of the body; a latch coupled to the body near the second side, wherein the latch is coupled at a variable distance away from the back from the top to the bottom of the body; and a retaining device configured to secure the one or more batteries to the body, the retaining device comprising: a hinge pin receiver, a lock mechanism that is lockable to and releasable from the latch, and an arm that extends between the hinge pin receiver and the lock mechanism.

Other features of the aspect of the present application may include one or more of the following: wherein the battery powered device is integral with the body of the battery retention system; wherein the battery powered device is a separate battery powered device configured to be electrically coupled to the battery retention system; wherein the hinge pin is coupled at a distance away from the back that varies linearly from the top to the bottom of the body; wherein the latch is coupled at a similar variable distance away from the back from the top to the bottom of the body as the hinge pin; wherein the retaining device is configured to secure the one or more batteries to the body by extension of the arm transversely across the longitudinal axes of the batteries; wherein the hinge pin receiver includes a substantially U-shaped cross-section to fit around the hinge pin when the one or more batteries are being secured to the body; and/or wherein movement of the retaining device laterally substantially parallel with the plane of the back results in the distance between the retaining device and the back being altered.

Another aspect of the present application may include a method of retaining one or more batteries comprising: positioning one or more batteries in a body of a battery retention system, wherein the body includes a back, a first side, and a second side, the body being configured to receive one or more batteries that provide battery power to a battery powered device; coupling a retaining device to the body to secure the one or more batteries to the body; and moving the retaining device laterally substantially parallel with the plane of the back to selectively alter a distance between the retaining device and the back.

Other features of the aspect of the present application may include one or more of the following: wherein the act of coupling between the retaining device and the body includes making a coupling that permits sliding; wherein the act of coupling between the retaining device and the body includes making a coupling along inclined components of one or both of the body and the retaining device; wherein the act of coupling between the body and the retaining device includes attaching a hinged coupling near the first side between the body and the retaining device and attaching a releasable lock coupling near the second side between the body and the retaining device; wherein the act of moving the retaining device laterally occurs after the act of attaching the hinged coupling but before the act of attaching the releasable coupling; wherein the act of moving the retaining device laterally occurs after the act of attaching the hinged coupling and after the act of attaching the releasable coupling; and/or wherein the act of moving the retaining device laterally substantially parallel with the plane of the back includes moving the retaining device along the first and second sides.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   a casing including a mounting plate that at least partially defines a receiving space sized and configured to receive an energy storage device;
   an electronic device configured to receive electrical power from the energy storage device; and
   a retaining member operable to selectively retain the energy storage device within the receiving space, the retaining member including a plate portion and having a first state in which the plate portion has a predetermined orientation relative to the mounting plate, and in which the plate portion is offset from the mounting plate such that a width dimension of the receiving space is defined between the plate portion and the mounting plate;
   wherein the retaining member is constrained to movement along a path extending at an oblique angle relative to the mounting plate; and
   wherein the retaining member is movable along the path to adjust the width dimension of the receiving space while maintaining the predetermined orientation of the plate portion relative to the mounting plate.

2. The system of claim 1, wherein with the retaining member in the first state, movement of the retaining member along the path in a first direction increases the width dimension of the receiving space, and wherein movement of the retaining member along the path in an opposite second direction decreases the width dimension of the receiving space.

3. The system of claim 1, further comprising a mounting assembly mounted to the casing, wherein the retaining member is operable to be movably coupled to the mounting assembly;
    wherein the mounting assembly includes a first mounting device and a second mounting device; and
    wherein each of the first mounting device and the second mounting device extends at the oblique angle relative to the mounting plate.

4. The system of claim 3, wherein the retaining device further comprises a first coupling device and a second coupling device; and
    wherein with the retention assembly in the first state, the first coupling device is movably engaged with the first mounting device, and the second coupling device is movably engaged with the second mounting device.

5. The system of claim 4, wherein the retaining member has a second state in which the first coupling device is disengaged from the first mounting device, and the plate portion is not constrained to movement along the path.

6. The system of claim 5, wherein with the retaining member in the second state, the second coupling device is engaged with the second mounting device and discourages removal of the retaining device from the mounting assembly.

7. The system of claim 6, wherein the second mounting device comprises a hinge pin;
    wherein the second coupling device comprises a channel operable to slidably receive the hinge pin; and
    wherein with the retaining member in the second state, the retaining member is pivotable about the hinge pin.

8. The system of claim 7, wherein the second coupling device further comprises a protrusion extending into the channel; and
    wherein with retaining member in the second state, the protrusion discourages removal of the hinge pin from the channel while permitting pivoting of the retaining member about the hinge pin.

9. The system of claim 7, wherein the first mounting device includes a latching lip, and wherein the first coupling device includes a catch operable to slidably engage the latching lip.

10. The system of claim 6, wherein the retention member has a third state in which the first coupling device is disengaged from the first coupling member, the second coupling device is disengaged from the second coupling member, and the retaining member is decoupled from the mounting assembly.

11. The system of claim 1, wherein the retention assembly has a second state in which the retaining member is decoupled from the mounting assembly.

12. The system of claim 1, further comprising the energy storage device.

13. The system of claim 12, wherein the energy storage device comprises at least one battery.

14. The system of claim 13, wherein the energy storage device comprises a plurality of batteries.

15. An apparatus, comprising:
    a housing including a mounting plate;
    an electronic device mounted in the housing;
    a receiving space defined in part by the mounting plate, wherein the receiving space is sized and shaped to receive an energy storage device operable to supply electrical power to the electronic device;
    a first ramp and a second ramp, wherein the first ramp and the second ramp are positioned on opposite sides of the receiving space and extend away from the mounting plate; and
    a retaining device slidably coupled with the first ramp and the second ramp such that the retaining device is movable along a path defined by the first ramp and the second ramp.

16. The apparatus of claim 15, wherein movement of the retaining device along the path defined by the first ramp and the second ramp adjusts a width dimension of the retaining device.

17. The apparatus of claim 15, wherein the retaining device includes a plate portion that remains parallel to the mounting plate as the retaining device moves along the path defined by the first ramp and the second ramp.

18. The apparatus of claim 15, further comprising the energy storage device, wherein the energy storage device is seated in the receiving space, is retained within the receiving space at least in part by the retaining member, and is electrically connected with the electronic device.

19. The apparatus of claim 15, wherein the first ramp and the second ramp are parallel with one another and extend at an oblique angle relative to the mounting plate.

20. The apparatus of claim 15, wherein the retaining device is selectively latched to the first ramp, and wherein the retaining device is operable to pivot about the second ramp when the retaining device is unlatched from the first ramp.

\* \* \* \* \*